Feb. 21, 1939.  J. R. WALTON  2,148,312
INTERNAL COMBUSTION ROTARY ENGINE
Filed Sept. 25, 1937  2 Sheets-Sheet 1
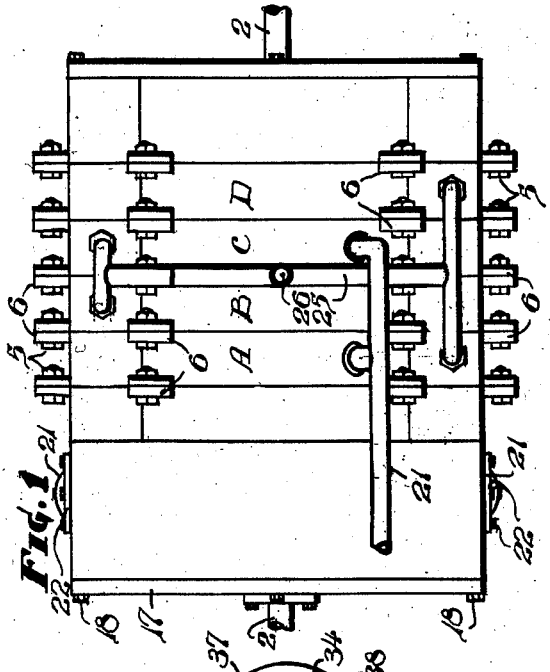
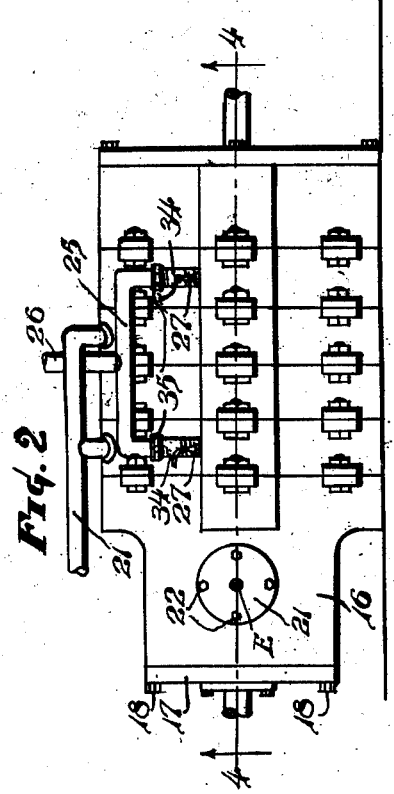
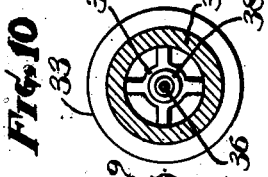
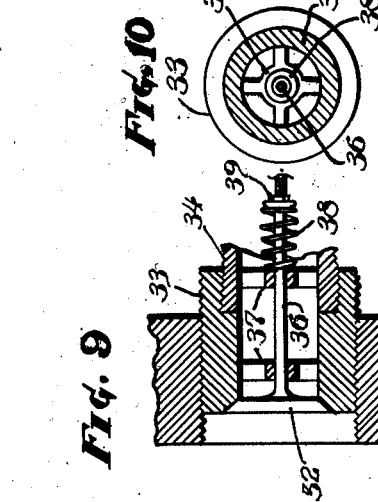
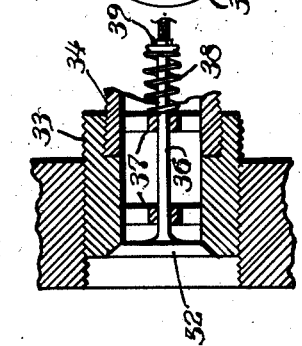
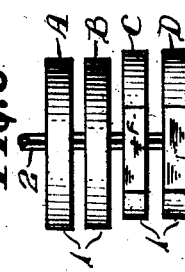
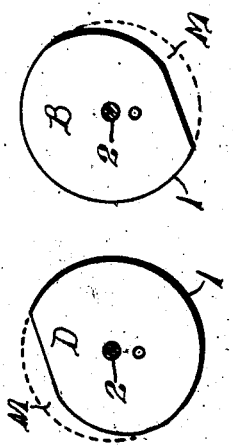
INVENTOR.
JOHN R. WALTON
BY U.S. Charles
ATTORNEY.

Feb. 21, 1939.  J. R. WALTON  2,148,312
INTERNAL COMBUSTION ROTARY ENGINE
Filed Sept. 25, 1937   2 Sheets-Sheet 2
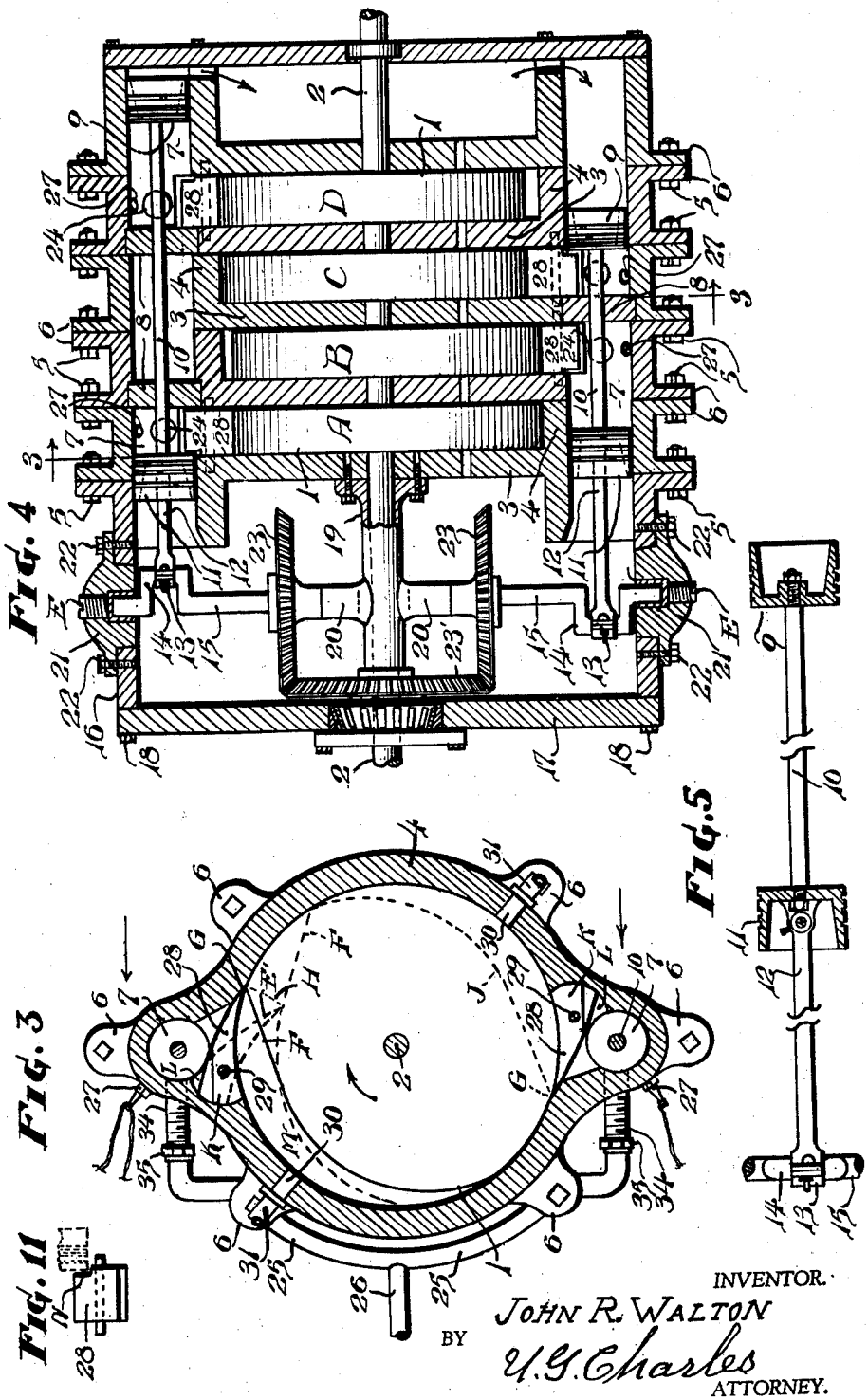
INVENTOR.
John R. Walton
BY
U. G. Charles
ATTORNEY.

Patented Feb. 21, 1939

2,148,312

UNITED STATES PATENT OFFICE 2,148,312

INTERNAL COMBUSTION ROTARY ENGINE

John R. Walton, Wichita, Kans.

Application September 25, 1937, Serial No. 165,739

3 Claims. (Cl. 123—15)

My invention relates to improvements in internal combustion rotary engines.

The object of my invention is to impart rotary motion to a drive shaft through the medium of a series of rotors secured to the shaft and means to energize the rotors individually or plurally by fuel combustion.

A further object of my invention is to provide simultaneous combustion for pairs of rotors, each of which receives the impact oppositely with respect to the diametrical axis to avoid a side thrust upon the shaft to which the rotors are attached.

A still further object of my invention is to provide a fuel compressor actuated by the rotation of the shaft and co-acting with a compression piston, operative within a fuel intake and compression chamber therefor and means to actuate the piston in its timed relation with the turn of the rotor.

A still further object of my invention is to provide means whereby the interior or capacity of contents thereof will be increased as the rotor turns and means on the rotor to receive the impact of ignition to turn the rotor in one direction until the force of expansion through ignition of the fuel has been exhausted.

These and other objects will hereinafter be more fully explained, reference being had to the accompanying drawings forming a part of this specification and in which like characters will apply to like parts in the different views.

Referring to the drawings:—

Fig. 1 is a top view of the engine to illustrate the position of manifolds.

Fig. 2 is a side view of Fig. 1.

Fig. 3 is an enlarged cross section view of the engine, taken on line 3—3 in Fig. 4.

Fig. 4 is a sectional view through the housing longitudinally, taken on line 4—4 in Fig. 2 looking in the direction of arrows.

Fig. 5 is an enlarged view of the piston rod arrangement, the pistons sectionally shown and positioned transverse to the crank connection.

Fig. 6 is a reduced rear view of the rotor assembly on the shaft.

Fig. 7 is an end view of Fig. 6.

Fig. 8 is a similar view to that of Fig. 7 to illustrate the reverse position of the rotors with respect to their peripheral inset.

Fig. 9 is an enlarged view of the intake valve arrangement.

Fig. 10 is an outer end view of the valve plug.

Fig. 11 is the arcuate end view of one of the rocking abutments, showing its side inset to avoid contact with the piston head.

The rotary engine contemplated in this application contains certain improvements over that which was shown and described in my former application filed Mar. 23, 1936, Serial Number 70,226, now abandoned, and the said improvements together with other component parts thereof as above set forth consist of a plurality of rotors 1 secured to a shaft 2; the arrangement and form of the rotors will hereinafter be more fully explained and referred to by letters A, B, C and D.

Each rotor element has a housing consisting of one side 3 and an annular rim 4 in which the said rotor turns, the said housings abut each other so that the outer portion of the side will engage snugly on the rim as closing means for the other side of each succeeding rotor, and being secured by bolts 5 extending through apertured ears 6 that project from the rim and side of each housing, by which means access to each rotor is easily accomplished, it being understood that the sides of the said housings are axially bored to receive the said shaft rotatable therein.

Oppositely positioned in the housings, with respect to the diametrical axis thereof, are formed compression and ignition chambers 7, the said chambers being composed of sections joined to their respective rotor housings and axially aligned as shown in Figs. 3 and 4, and being subdivided by stationary heads 8 into chambers in which pistons 9 reciprocate, said pistons being secured to corresponding ends of rods 10 which extend slidably through apertures in heads 8.

Each of the rods has a skirted piston 11 secured to the corresponding ends thereof, within the skirt of each of the last said pistons is rockably secured one end of a connecting arm 12, the other end of which has a bearing 13 to engage on a crank 14 of a shaft 15, as actuating means for reciprocating the said pistons when the last said shaft is turned.

Secured to one end of the rotor housings is a crank case 16, preferably rectangular in form as shown in Figs. 1, 2 and 4, and being secured to said housing by bolts similar to those indicated by numerals 5, the said crank case has a removable cap 17 secured in place by cap screws 18, by which means access is had to the crank case.

Removably secured to the side enclosure of rotor A is a sleeve 19 axially extending into the crank case, the said sleeve being axial with the rotor housings and bored to receive the shaft 2 rotatable therein.

Oppositely extending and integrally joined near the longitudinal center of the sleeve are hubs 20 bored axially and functioning as bearings for the inside ends of the crank shafts 15, the outer ends of said shafts have their bearings in plates 21 that are secured to the crank case housing respectively, said plates removably arranged and secured by cap screws 22, each plate has a bushing 22' in which the shaft end is trunnioned, each bushing has an adjusting screw E to move the same longitudinally.

Secured rigidly to each shaft is a miter gear 23, which is in mesh with a similar gear 23' secured rigidly to shaft 2, by which means the said crank shafts are turned, actuating the movement of the pistons reciprocatingly and alternately in opposite directions; there being two pistons on each rod for a type of engine having four rotatable elements on the drive shaft, consequently, a thrust in each direction of the said rods, compression and intake will alternately occur at the maximum stroke of each of said rods through the medium of their respective pistons, by which means ignition of fuel occurs, impounding the force upon two of the rotors simultaneously and oppositely with respect to the axis on which they turn, and a similar ignition of fuel for another pair of the rotors and so on alternately, in other words, referring to Fig. 4, rotors A and C are at the moment of ignition as their respective pistons have reached their maximum inward movement for compression, while rotors B and D show their respective pistons at the maximum outward position for fuel intake and vice versa as the rotors turn, the said pistons alternately reverse in their function.

It is now clearly shown that the force of fuel combustion to turn the said drive shaft 2 is applied simultaneously at opposite sides thereof as means to avoid a side thrust.

Each rotor is equipped with an intake valve 24 and a manifold 25 respectively, the said manifolds being fed by a branch pipe 26, the fuel for which passes from a supply tank through an appropriate carburetor, the tank and carburetor not being shown in the drawings, there is also a spark plug 27 for each combustion chamber, while the electric current feed wires extend to a distribution box of a conventional type and method of operation by the turn of the drive shaft, the said distribution box omitted from the drawings, all of which are timed in working relation to their respective rotors to feed and ignite the fuel simultaneously in pairs of chambers as previously described.

In Fig. 3 is shown the form of the peripheral contour for each rotor at the time of ignition, different positions of the rotor being indicated by dotted lines. The contour consists of a segmental portion of approximately two thirds of the circumference and being of equal radii from the center of the shaft to which it is secured, another minor portion of the circumference having its radii eccentrically positioned to approach nearer the center at its terminal point and from thence tangentially in a straight line intersecting with the beginning of the first named segmental portion, being so arranged a cam is formed by the straight tangential portion, functioning as a head to turn the rotor in the direction of the arrow and also as a turning means for the rotor by the force of fuel ignition acting upon a rocking abutment 28, the width of which is equal to the thickness of its respective rotor and to work with a smooth running fit between the side housings 3 and pivotally carried by the housing as at 29, the outer end adapted to slidably engage on the periphery of the rotor during rotation thereof, and when rocked downward to the position shown by dotted lines E' is means to turn the rotor with the tangent line as shown at F, and at the time of the rocking abutment movement inward, by the force of ignition, is means to provide flexibility to increase the area contents of the ignition chamber as the rotor turns, otherwise the force of such ignition would be equal from a common center and void of expansion for a driving tendency to turn the rotor and upon the start of compression by the piston, the said rocking abutment will co-act therewith as forced outward by the cam feature of the rotor and retained in its normally closed position until the rotor point G leaves the free point of the rocking abutment, at which instant ignition of the compressed fuel takes place.

It will be understood that the inward movement of the free end of the rocking abutment which moves along the dotted line H, and bears upon the tangential straight portion of the rotor is the cam feature previously referred to, as driving means for the rotor when the force of fuel ignition takes place.

In Fig. 3 is shown the position of the rocking abutment and head of one of the rotors by whole lines as the housing is removed and also the opposite position of an adjacent rotor and rocking abutment by dotted lines J and also their respective compression and ignition chamber.

The said rocking abutment herein referred to is pivotally mounted eccentrically with respect to its length, and the minor length portion as at K, is arcuate in form and adapted to rock in a cavity L conforming thereto as sealing means between the combustion chamber and rotor cavity M, by which means the force of fuel ignition will divide its impact on opposite sides of the pivot point, whereby excess friction is reduced at the point of engagement of said abutment upon the rotor cam.

In Fig. 11 is shown a depression N in one side of the said rocking abutment as a means to avoid contact of the piston at its maximum stroke toward said abutment.

Each rotor has an exhaust 30 communicating with pipes 31 and the said exhaust will also function as an intake for the space between the housing flange and the eccentric peripheral portion of the rotor to avoid a vacuum therebetween during further rotation, should the free point of the rocking abutment remain in contact with the peripheral edge thereof during rotation.

In Fig. 9 is shown a conical intake valve 32 seated in the inner end of a nippple 33, that threadedly engages in the wall of said combustion chamber and to which a fuel pipe 34 is attached by threaded engagement, and the said pipe being of short length and joined to an extension thereof by a union 35 as means to simplify the removal or insertion of said nipple.

The conical valve above referred to has a stem 36 axially extending through said nipple and supply pipe and being guided by apertured spiders 37, in which the said stem slidably engages, and the said stem has a spring 38 coiled thereon, one end of which seats on the spider adjacent thereto while the other end is seated on a nut 39 that threadedly engages on the outer end of said stem, by which means the said valve is properly tensioned to a closed position but free to open by a vacuum in said combustion chamber at the time of fuel intake.

While I have shown an engine having four rotable elements and a pair of compression chambers oppositely positioned to each other, I do not wish to be confined to such alone as the number of rotors may vary and other like chambers may be applied transversely positioned or otherwise to those shown, and furthermore by the elimination of the spark plug, the frusto-conical valve for the intake is supplemented by a spray nozzle injection for the fuel, in which case compression ignition may be achieved, the latter not being shown in the drawings and such other modifications may be employed as lie within the scope of the appending claims.

Having fully described my invention, what I claim as new and desire to secure by Letters Patent is:—

1. In an internal combustion rotary engine of the class described, consisting of a plurality of circular housings and means to connect the same in axial alignment, rotors positioned in the housings, there being one for each housing, and a series of compression and ignition chambers, each having an opening to communicate with its respective housing, there being two series of said chambers oppositely positioned with respect to the diametrical axis of the said housings, pistons for each series of ignition chambers, each of said piston series being rigidly connected by a rod, and a crank shaft and a connecting rod for each of said series of pistons, and a gear secured to each crank shaft as turning means therefor, a drive shaft axially extending through said housings and rotors and adapted to rotate in the housings, the shaft being secured to the said rotors and rotatable therewith, a gear secured to the shaft and being in mesh with the first said gears, each of said rotors having a head formed thereon, a rocking abutment for each rotor, the rocking abutment pivotally carried by the housing and adapted to close the opening between the ignition chamber and rotor, the free end of the rocking abutment to engage with the head of the rotor as driving means therefor at the moment of fuel ignition.

2. In an internal combustion rotary engine of the class described, a shaft, a plurality of peripherally cam shaped and headed rotors secured to the shaft and rotatable therewith, a housing for each rotor element, the heads of the rotors alternately staggered by turning the alternates one hundred eighty degrees as a balancing means to receive force of ignition simultaneously and oppositely with respect to the axis of the shaft to avoid a side thrust upon the shaft as the latter is turned, a compression chamber for each housing having a fuel intake valve, said chamber having an opening as communicating means with its respective housing, an abutment rockably positioned in the opening as driving means for the rotor, the abutment pivotally connected medially of its ends whereby the force of ignition is counterbalanced, and means in the housing to exhaust the ignited fuel, a pair of rods oppositely disposed with respect to the diametrical axis of the rotors, each rod having a plurality of pistons secured thereto in working relation to their respective compression chambers, a crank shaft, and a rod connecting each crank to the first said rods respectively, a gear secured to each of said crankshafts, and a gear in mesh with each of the first said gears, the last gear being secured to the first said shaft, by which means, the pistons are moved reciprocatingly as fuel injectors and compressors, and means to ignite the fuel alternately in pairs with respect to the rotor elements in their consecutive order as the rotors turn.

3. In an internal combustion rotary engine of the class described, a shaft, a plurality of peripherally cam shaped and headed rotors secured to the shaft and rotatable therewith, and a housing for each rotor element, the heads of the rotors alternately staggered by turning the alternates one hundred eighty degrees as a balancing means and to receive the force of ignition simultaneously and oppositely with respect to the axis of the shaft, to avoid a side thrust upon the shaft as the latter is turned, a compression chamber for each oppositely disposed pair of rotors heads, there being an opening in each chamber communicating with its respective rotors, a rocking abutment mounted in each opening and carried by the housing, the free end of each rocking abutment to engage on the head of its respective rotor as driving means for the turn of the rotors at the moment of ignition, the rocking abutment being gradually moved by the cam of the rotor to close the opening for a repeated charge and compression of the fuel, and means in the housing to exhaust the ignited fuel.

JOHN R. WALTON.